United States Patent Office 3,070,597
Patented Dec. 25, 1962

3,070,597
3-OXO-14-HYDROXY-11α,19-DIACETOXY-CARDADIEN-(1,4)-OLIDE AND ALLIED COMPOUNDS
Christoph Tamm, Riehen, Switzerland, and Gert Volpp, Cambridge, Mass., assignors to Sandoz Ltd. (also known as Sandoz A.G.), Basel, Switzerland, a Swiss firm
No Drawing. Filed Dec. 26, 1961, Ser. No. 162,268
Claims priority, application Switzerland Dec. 29, 1960
4 Claims. (Cl. 260—239.57)

The present invention relates to a novel 11-acetoxy-Δ$^{1,4}$-3-ketone of the corticosteroid series and to a method for its manufacture, said compound having the formula

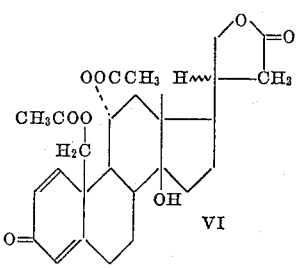

VI

GENERAL METHOD OF PREPARATION

To prepare the novel 3-oxo-14-hydroxy-11α-19-diacetoxy-cardadien-(1,4)-olide of the Formula VI, the 5-hydroxy group of 3-oxo-5,14-dihydroxy-11α-19-diacetoxy-carden-(1)-olide of Formula V

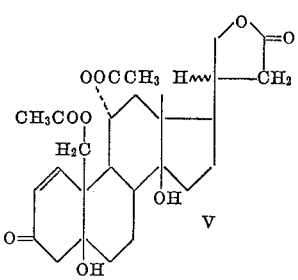

V is split of with glacial acetic acid.

The Compound V may be produced by acetylating 3-oxo-5,11α-14,19-tetrahydroxy-carden-(1)-olide of Formula IV.

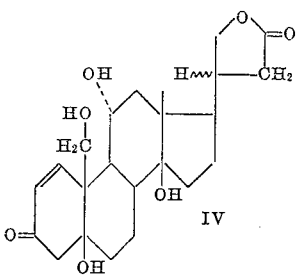

IV

A Compound V may further be produced by acetylating 3-oxo-1α,11α - epoxy - 5,14,19 - trihydroxy-cardanolide of Formula III.

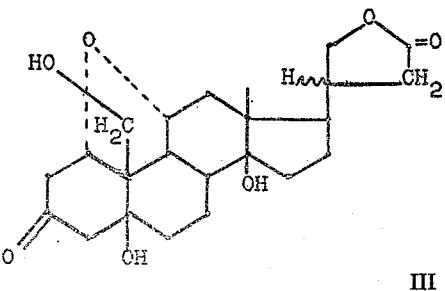

III

Acetylation of a mixture of Compounds III and IV will naturally also yield the desired Compound VI and this procedure also forms part of the present invention.

The Compounds III and IV may be produced by selective dehydrogenation of 1α,11α-epoxy-3β,5,14,19-tetrahydroxy-carbanolide II.

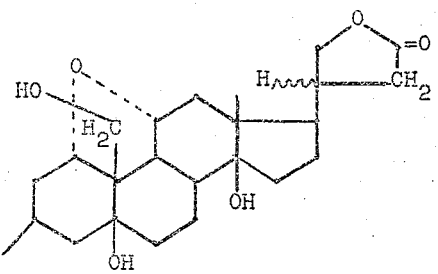

II

The Compound II may be formed by catalytically hydrogenating monoanhydro - ouabagenin (i.e. 1α,11α - epoxy-3β,5,14,19-tetrahydroxy-carden-(20:22)-olide or 1α,11α-epoxy-strophanthidol) of Formula I.

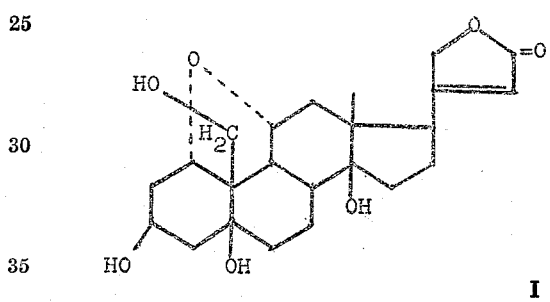

I

Compound VI contains a group which is characteristic of a great number of therapeutically active corticosteroids and itself shows some mineral corticoidal and gluco-corticoidal properties. For example the Δ$^{1,4}$-3-ketone structure of the ring A is characteristic of the prednisolone series. Compound VI may also be used as an intermediate compound in the production of chemotherapeutically interesting corticoid analogues.

Monoanhydro-ouabagenin I may be produced by treating ouabain, i.e. 1,19-isopropylidene-ouabagenin, with dilute hydrochloric acid in aqueous alcohol, or by splitting water from ouabagenin under the same conditions.

Compound VI may, for example, be produced as follows: Compound I is catalytically hydrogenated, e.g. with platinum in glacial acetic acid, to form Compound II which is then dehydrogenated selectively, e.g. with O$_2$—Pt in aqueous acetone, a mixture of the main product IV and the by-product III resulting. The mixture is then converted to Compound V by acetaylation, e.g. with acetic acid anhydride pyridine. By boiling with glacial acetic acid for 30 minutes the 5-hydroxy group of Compound V is selectively split off, the desired Compound VI resulting.

In the following non-limitative examples all temperatures are stated in degrees C. The melting points are corrected.

EXAMPLE (I) *Dihydro-Monoanhydro-Ouabagenin From Monoanhydro-Ouabagenin*

A solution of 600 mg. of monoanhydro-ouabagenin having a melting point of 306–316° in 30 cc. of glacial acetic acid is hydrogenated with 165 mg. of PtO$_2$.H$_2$O at 22°. The absorption of hydrogen (156 cc. of H$_2$) ceases after an hour. The Kedde reaction is negative.

The Kedde reaction is effected as follows: A solution of 0.02–0.05 mg. of compound in 0.01 cc. of methanol is placed dropwise onto filter paper and sprayed with a solution of 2 g. of 3,5-dinitrobenzoic acid in 100 cc. of methanol and 5.6 g. of potassium hydroxide in 100 cc. of water. In the case of a positive reaction the spot becomes blue. After filtration of the solution to remove the platinum catalyst and evaporation of the filtrate in a vacuum the residue is taken up in chloroform/ethanol (3:1), washed with a 2 N sodium carbonate solution and water, dried over $Na_2SO_4$ and evaporated. The crude product (598 mg.) yields 535 mg. of crystals having a melting range of 223–231° from methanol/ether. After recrystallization prisms having a double melting point of 230–234°/253/259°; $[\alpha]_D^{24} = +31.5° \pm 2°$ (c.=1.303 in methanol). $Rf=0.59$ on paper chromatography using the system water/butanol (9 hours); the spots were made visible by development with 20% solution of $SbCl_3$ in chloroform. The compound is transparent to ultraviolet rays. IR spectrum (KBr) bands at approximately $2.9\mu$ (OH) and $5.63\mu$ (C=O, $\gamma$-lactone).

The monoanhydro-ouabagenin used as a starting material is produced as follows:

(a) MONOANHYDRO - OUABAGENIN ($1\alpha,11\alpha$ - EPOXY-$3\beta,5,14,19$ - TETRAHYDROXY-CARDEN-(20,22)-OLIDE; $1\alpha,11\alpha$-EPOXY-STROPHANTHIDOL FROM 1,19-ISOPROPYLIDENE-OUABAGENIN 6.0 g. of 1,19-isopropylidene-ouabagenin having a melting point of 282–288° are boiled at reflux for one hour with 600 cc. of 95% ethanol containing 3.5 cc. of HCl (=0.05 N. HCl). The mixture is then evaporated to dryness in a vacuum and the residue crystallised from methanol/ether. 1.90 g. of crystalline monoanhydro-ouabagenin having a melting point of 262–275° result. After recrystallisation from methanol/ether needles having a melting point of 274–275° (decomposition) and [306–316° (decomposition) (Kofler Block)]; $[\alpha]_D^{22} = +46° \pm 2°$ (c.=0.467 in methanol). A solution in methanol-chloroform does not give a yellow colouration with tetranitromethane. IR-spectrum (KBr) bands at approximately $2.93\mu$ (OH), $5.54\mu$ and $5.76\mu$ (C=O, butenolide ring) $6.20\mu$ (C=C, butenolide ring). The mother liquor residues (2.3 g.) are chromatographed on 69 g. of $Al_2O_3$. For the purpose of washing 230 cc. of solvent per fraction are used. Fraction 1 [eluted with chloroform/methanol-(99:1)] yields 12 mg. of amorphous material. Fraction 2 [591 mg. eluted with chloroform/methanol-(99:1)] yields 168 mg. of tetraanhydro-ouabagenin having a melting point of 121–130°, which crystallises slowly from methanol/ether.

The fractions 3–14 [eluted with chloroform/methanol-(99:1), (98:2) and (97:3)] yield 903 mg. of amourphous material. The fractions 15–25 [656 mg. eluted with chloroform/methanol-(95:5), (90:10) and (80:20)] yield 396 mg. of crystalline monoanhydro-ouabagenin having a melting point of 286–301° from methanol/ether.

(b) MONOANHYDRO-OUABAGENIN FROM OUABAGENIN 104 mg. of ouabagenin having a melting point of 240–250° (paper chromatographically pure) are boiled at reflux with 5 cc. of 96% ethanol containing 0.03 cc. of concentrated hydrochloric acid for half an hour. The residue resulting after evaporation in a vacuum yields 44 mg. of crystalline monoanhydro-ouabagenin having a melting point of 270–276° (decomposition) from methanol/ether. From the mixed melting point and paper chromatography it is seen that this compound is identical with that obtained in section (a).

(II) *Treatment of Dihydro-Monoanhydro-Ouabagenin With $O_2$—Pt, Then With Acetanhydride-Pyridine*

A solution of 585 mg. of dihydro-monoanhydro-ouabagenin having a melting point of 230–234° in 100 cc. of acetone and 80 cc. of redistilled water is shaken with platinum which has been freshly prepared from 240 mg. of $PtO_2.H_2O$ by hydrogenation, is shaken for 19 hours in an oxygen atmosphere. The mixture is then filtered through a layer of diatomaceous earth (Celite) shows at least 4 spots in the thin layer chromatograph (system chloroform+2% methanol). It is left to stand together with 8.5 cc. of pyridine containing 6.5 cc. of acetanhydride for 16 hours at 35°. The usual working up with chloroform yields 686 mg. of brown coloured crude product which showed the 3 spots, labelled A, B and C, in the thin layer chromatograph (system chloroform+12% methanol). It was chromatographed on 30 g. of silica gel. For the purpose of washing 60 cc. of solvent are used per fraction.

The fractions 1–10 [eluted with chloroform and chloroform/methanol (99:1)] yield only traces of amorphous material and spot A which could not be identified.

The fractions 11 and 12 [eluted with chloroform/methanol (98:2)] yield 53 mg. of amorphous mixture. Fraction 13 [48 mg. eluted with chloroform/methanol (98:2)] contains spot B (Rf value: 0.56) according to the thin layer chromatograph and yields 35 mg. of a by-product, di-O-acetyl-dihydro-monoanhydro-ouabagenin, in needles having a melting range of 219–228° from methanol/ether. The mixed melting point, thin layer chromatograph, ultraviolet spectrum (transparent) and IR spectrum confirm the structure of the material.

The fractions 14–21 [eluted with chloroform/methanol (98:2)] yield 139 mg. of amorphous mixture which still contains spot B.

The fractions 22–30 [323 mg. eluted with chloroform/methanol (97:3)] contain spot C (Rf value: 0.28) according to the thin layer chromatograph. The fact that spot C is the $\Delta^1$-3-ketone V is confirmed by UV spectrum: $\lambda_{max}=232$ m$\mu$; log $\epsilon=3.95$ and $\lambda_{max}=316$ m$\mu$; log $\epsilon=1.50$ (ethanol). IR spectrum ($CH_2Cl_2$) bands at $2.78\mu$ and $2.88\mu$ (OH); $5.56\mu$ (C=O, $\gamma$ lactone); $5.77\mu$ (C=O, acetyl); $5.96\mu$ (C=O,$\Delta^1$-3-ketone); $6.21\mu$ (C=C,$\Delta^1$-3-ketone) and $8.13\mu$ (C—O—C, acetate).

The treatment of dihydro-monoanhydro-ouabagenin with $O_2$—Pt in acetone/water was repeated in order to determine at what stage the epoxy group was removed. A solution of 26 mg. of dihydro-monanhydro-ouabagenin in 8 cc. of acetone containing 6 cc. of redistilled water is shaken in an atmosphere of oxygen for 24 hours with Pt, which has been freshly prepared from 15 mg. of $PtO_2.H_2O$ by hydrogenation. The mixture is then filtered through a layer of diatomaceous earth (Celite No. 535) and evaporated. On developing the thin layer chromatograph of the crude product 2 spots are obtained: IR spectrum (KBr) bands at $2.91\mu$ (OH); $5.68\mu$ (C=O, $\gamma$-lactone); $5.84\mu$ (C=O, six ring ketone); $5.99\mu$ (C=O, $\Delta^1$-3-ketone) and $6.21\mu$ (C=C, $\Delta^1$-3-ketone, weak). Ultraviolet spectrum: $\lambda_{max}=238$ m$\mu$; log $\epsilon=3.69$ and shoulder at 295–320 m$\mu$; log $\epsilon=1.74$ (ethanol). From the $\epsilon$ value of the maximum of 236 m$\mu$ it may be seen that the crude product consists of approximately 45% of saturated $1\alpha,11\alpha$-epoxy-3-ketone III and approximately 55% of $11\alpha$-hydroxy-$\Delta^1$-3-ketone IV.

(III) *11-Acetoxy-$\Delta^{1,4}$-3-Ketone From $11\alpha$-Hydroxy-$\Delta^1$-3-Ketone*

230 mg. of amorphous $\Delta^1$-3-ketone (spot C) are heated at reflux with 10 cc. of glacial acetic acid for half an hour. The mixture is then evaporated, and the residue taken up in chloroform and filtered through a layer of diatomaceous earth (Celtite No. 535) and evaporated. The crude product (239 mg.) yields 178 mg. of crystals having a melting range of 202–216° from acetone/ether. After recrystallization from acetone/ether prisms of compound VI having a melting point of 201–215° result; $[\alpha]_D^{21}=+22° \pm 1.5°$ (c.=1765 in chloroform). Ultraviolet spectrum: $\lambda_{max}=243$ m$\mu$; log $\epsilon=4.18$ and 330 m$\mu$; log $\epsilon=1.67$ (ethanol). In the infrared spectrum ($CH_2Cl_2$) bands at $2.73\mu$ (OH); $5.65\mu$ (C=O, $\gamma$-lactone); $5.76\mu$ (C=O, acetyl); $6.01\mu$ (C=O, $\Delta^{1,4}$-3-ketone); $6.15\mu$ and 6.23μ (C=C, Δ$^{1,4}$-3-ketone) and 8.08μ (C—O—C, acetate).
Having thus disclosed the invention what is claimed is:
1. The compound having the Formula VI
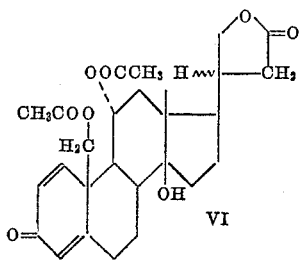
2. 3-oxo-5,14-dihydroxy-11α,19-diacetoxy-carden-(1)-olide.
3. 3-oxo-5,11α,14,19-tetrahydroxy-carden-(1)-olide.
4. 3-oxa-1α-11α-epoxy-5,14,19-trihydroxy-carden-olide.
No references cited.